(12) United States Patent
Valera et al.

(10) Patent No.: US 9,946,068 B2
(45) Date of Patent: Apr. 17, 2018

(54) OPTICAL WAVEGUIDE AND DISPLAY DEVICE

(75) Inventors: Mohmed Salim Valera, Chatham (GB); Michael David Simmonds, Ashford (GB)

(73) Assignee: BAE SYSTEMS plc, London (GB)

( * ) Notice: Subject to any disclaimer, the term of this patent is extended or adjusted under 35 U.S.C. 154(b) by 674 days.

(21) Appl. No.: 13/642,966

(22) PCT Filed: Apr. 19, 2011

(86) PCT No.: PCT/GB2011/050772
§ 371 (c)(1),
(2), (4) Date: Oct. 23, 2012

(87) PCT Pub. No.: WO2011/131978
PCT Pub. Date: Oct. 27, 2011

(65) Prior Publication Data
US 2013/0044376 A1 Feb. 21, 2013

(30) Foreign Application Priority Data

Apr. 23, 2010 (EP) .................................... 10275047
Apr. 23, 2010 (GB) .................................. 1006792.4

(51) Int. Cl.
*G02B 5/18* (2006.01)
*G02B 27/01* (2006.01)
(Continued)

(52) U.S. Cl.
CPC ..... *G02B 27/0101* (2013.01); *G02B 27/0081* (2013.01); *G02B 27/0172* (2013.01);
(Continued)

(58) Field of Classification Search
CPC ............... G02B 5/1814; G02B 6/0076; G02B 6/29329; G02B 6/2938; G02B 27/0172;
(Continued)

(56) References Cited

U.S. PATENT DOCUMENTS 4,733,065 A * 3/1988 Hoshi .................. G11B 7/1353
  250/201.5
6,580,529 B1 6/2003 Amitai et al.
(Continued)

FOREIGN PATENT DOCUMENTS

EP 2 241 926 A1 10/2010
WO WO 2006/064325 A1 6/2006
(Continued)

OTHER PUBLICATIONS

International Preliminary Report on Patentability and Written Opinion, dated Nov. 1, 2012 from related International Application No. PCT/GB2011/050772.
(Continued)

*Primary Examiner* — Mustak Choudhury
(74) *Attorney, Agent, or Firm* — Scully, Scott, Murphy & Presser, PC

(57) ABSTRACT

An optical method of displaying an expanded color image comprising extracting from input light bearing said colored image a first spectral portion and a second spectral portion such that together the two portions contain sufficient information for the image to be displayed in substantially its original colors, separately expanding the two spectral portions each in two dimensions and recombining the expanded spectral portions to display the expanded color image.

12 Claims, 7 Drawing Sheets

(51) Int. Cl.
*G02B 27/00* (2006.01)
*F21V 8/00* (2006.01)

(52) U.S. Cl.
CPC .......... *G02B 6/0035* (2013.01); *G02B 6/0076* (2013.01); *G02B 2027/0112* (2013.01)

(58) Field of Classification Search
CPC .............. G02B 27/102; G02B 27/1086; G02B 27/4211; G02B 27/4216; G02B 27/4272; G02B 27/0101; G02B 5/1866; G02B 27/1013; G02B 27/107
USPC ... 359/31, 15, 16, 19, 32–34, 565–567, 618, 359/629, 630, 634, 639, 558, 569, 571, 359/572, 576; 349/201; 385/37
See application file for complete search history.

(56) References Cited

U.S. PATENT DOCUMENTS

| | | |
|---|---|---|
| 7,418,170 B2 | 8/2008 | Mukawa et al. |
| 2005/0001975 A1* | 1/2005 | Ishihara et al. ............... 349/201 |
| 2006/0077496 A1* | 4/2006 | Argoitia ............... B42D 25/328 359/2 |
| 2006/0221448 A1* | 10/2006 | Nivon .................. G02B 5/1814 359/572 |

FOREIGN PATENT DOCUMENTS

| | | |
|---|---|---|
| WO | WO 2006/106501 A1 | 10/2006 |
| WO | WO 2007/141587 A1 | 12/2007 |
| WO | WO 2008/023375 A1 | 2/2008 |
| WO | WO 2009/077802 A1 | 6/2009 |

OTHER PUBLICATIONS

Moharam, M.G. et al., "Diffraction analysis of dielectric surface-relief gratings", Journal of Optical Society of America (Oct. 1982), vol. 72, No. 10, pp. 1385-1392.

International Search Report and Written Opinion dated Jul. 5, 2011 issued in PCT/GB2011/050772.

Extended European Search Report dated Oct. 4, 2010 issued in European Publication No. EP 10275047.8.

UK Search Report dated Aug. 18, 2010 issued in GB1006792.4.

* cited by examiner

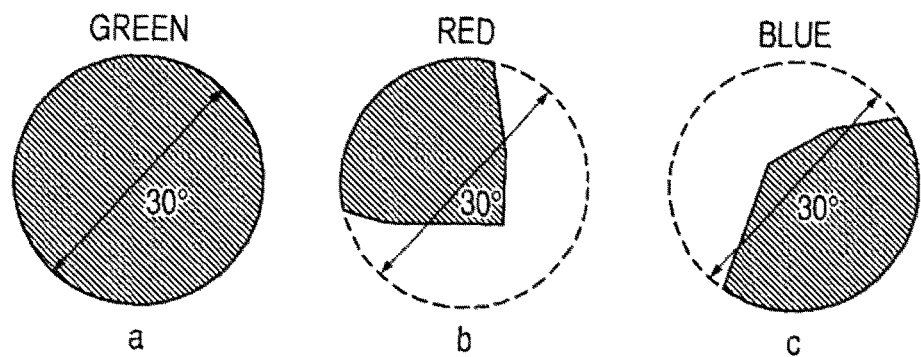
Fig.1.
(PRIOR ART)
Fig.2a.
FIRST WAVEGUIDE
(343nm pitch)
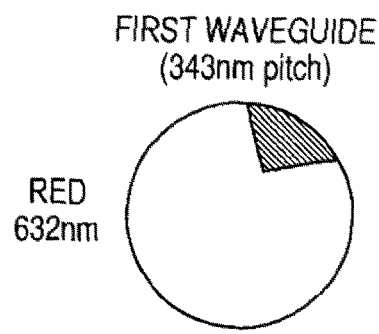 RED 632nm
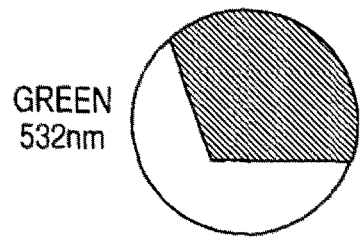 GREEN 532nm
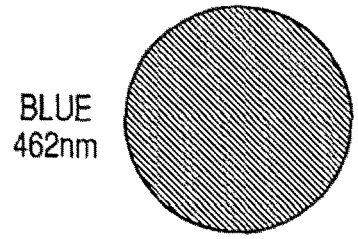 BLUE 462nm
Fig.2b.
SECOND WAVEGUIDE
(460nm pitch)
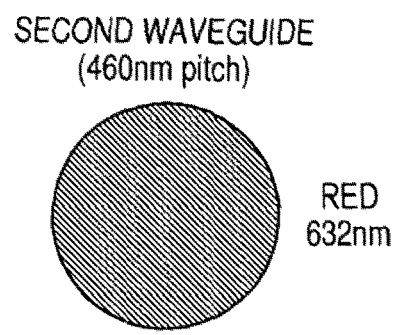 RED 632nm
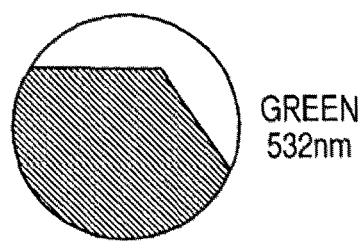 GREEN 532nm
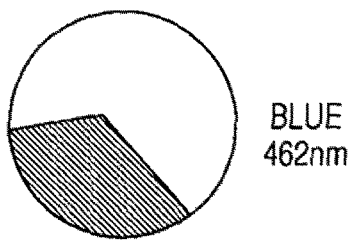 BLUE 462nm Response of 343nm period grating at 532nm Response of 343nm period grating at 462nm

OPTICAL WAVEGUIDE AND DISPLAY DEVICE

This invention relates to an optical waveguide and a display device. In particular it is relevant to display devices in which image bearing light is injected into a waveguide, is expanded therein e.g. by diffraction gratings, in two orthogonal dimensions to form a visible image and is released from the waveguide.

Such devices which use a single waveguide, for example as shown in U.S. Pat. No. 6,580,529, can be optimised only for one part of the visible spectrum. Usually the middle part of the spectrum is chosen, with the result that the display has a strong greenish hue.

To obtain a full colour display from this type of device it has been necessary to either limit the field of view, or employ three waveguides. Each waveguide is optimised for a different one of the three primary colours red, green and blue. The outputs of the three waveguides are then additionally combined to form an approximately full-colour display. Such a device has the disadvantages of complexity and cost, since three waveguides are required, and the further disadvantage of weight and bulk, which in particularly undesirable in head-mounted or helmet-mounted displays.

Alternatively, a full-colour solution is obtainable using a three-layer stacked volume grating in a single waveguide (U.S. Pat. No. 7,418,170) but such gratings are difficult to manufacture in quantity, and are consequently expensive.

The present invention at least in its preferred embodiments seeks to reduce some or all of the disadvantages of the prior art.

In one aspect the invention provides an optical method of displaying an expanded colour image comprising extracting from input light bearing said coloured image a first spectral portion and a second spectral portion such that together the two portions contain sufficient information for the image to be displayed in substantially its original colours, separately expanding the two spectral portions each in two dimensions and recombining the expanded spectral portions to display the expanded colour image.

The invention provides an optical structure comprising first and second waveguides for receiving light input thereto bearing a colour image and displaying said colour image, comprising a first diffraction region for diffracting a first spectral portion of the input light to propagate by total internal reflection along the first waveguide, the first spectral portion comprising at least a majority of a first primary colour component of the input light, part of a second primary colour component thereof and a minority of a third primary colour component thereof and a second diffraction region for diffracting a second spectral portion of the input light to propagate by total internal reflection along the second waveguide, the second spectral portion comprising a minority of the first primary colour component, part of the second primary colour component and at least the majority of the third primary colour component such that together the two spectral portions contain sufficient information for light outputted by the structure to display the image in substantially its original colours, the first and second diffracting regions having periodic diffracting patterns of different pitch and the first diffracting region comprising at least one coating layer on the diffracting pattern, the thickness and composition of the or each layer being such that interferences between reflections of at least the first primary colour component from some of the interfaces between the layers and/or between a said layer and another medium are constructive, a first expanding means for expanding the first spectral portion in two dimensions, a second expanding means for expanding the second spectral portion in two dimensions and means for combining the expanded first and second spectral portions to display the colour image.

The first diffraction region and the or each coating layer may be adapted to reflect the first spectral portion and to be transmissive to the second spectral portion.

The said coating layers on the first diffraction region may comprise a layer of silicon dioxide and a layer of titanium dioxide.

The second diffraction region may comprises a reflective layer and at least one coating layer, the thickness and composition of the or each such layer being such that interferences between reflections of at least the third primary colour component from the reflective layer and from at least one interface between the layers or between a said layer and another medium are constructive.

The reflective coating on the second diffraction region may comprise a layer of silver and the coating layer thereon is of titanium dioxide.

The two expanding means may be disposed relative to each other so that in operation the expanded first spectral portion passes from the first expanding means through the second expanding means, and the expanded first and second spectral portions are thereby combined as said image.

The invention also provides a display system comprising such an optical structure.

The invention also provides an optical method of displaying an expanded colour image comprising inputting light bearing a colour image into a first waveguide, diffracting with a first diffraction region a first spectral portion of the input light to propagate by total internal reflection along the first waveguide and to expand in two dimensions, the first spectral portion comprising at least a majority of a first primary colour component of the input light, part of a second primary colour component thereof and a minority of a third primary colour component thereof and diffracting with a second diffraction region a second spectral portion of the input light to propagate by total internal reflection along the second waveguide and to expand in two dimensions, the second spectral portion comprising a minority of the first primary colour component, part of the second primary colour component and at least the majority of the third primary colour component, combining the expanded first and second spectral portions such that together the two spectral portions contain sufficient information for light outputted by the structure to display the image in substantially its original colours, wherein the first and second diffracting regions have periodic diffracting patterns of different pitch and the first diffracting region comprising at least one coating layer on the diffracting pattern, the thickness and composition of the or each layer being such that interferences between reflections of at least the first primary colour component from some of the interfaces between the layers and/or between a said layer and another medium are constructive.

The invention also provides a helmet-mounted display, a head-up display or another display system comprising an optical structure or configured to implement a method as set forth above.

The invention now will be described merely by way of example with reference to the accompanying drawings; wherein:

FIG. 1 illustrates a problem of a prior art device;

FIG. 2 illustrates the principle of the present invention,

Figure 4A:
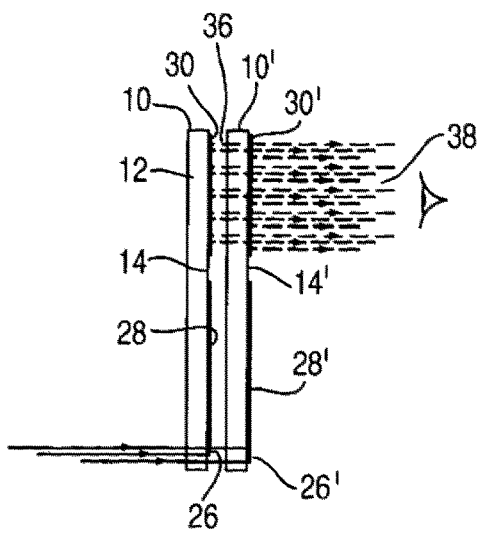
Figure 4B:
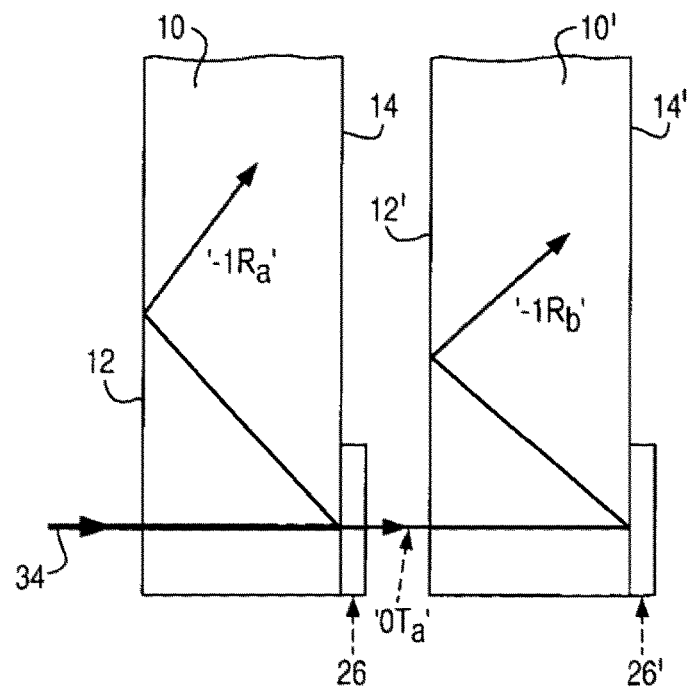
Figure 5:
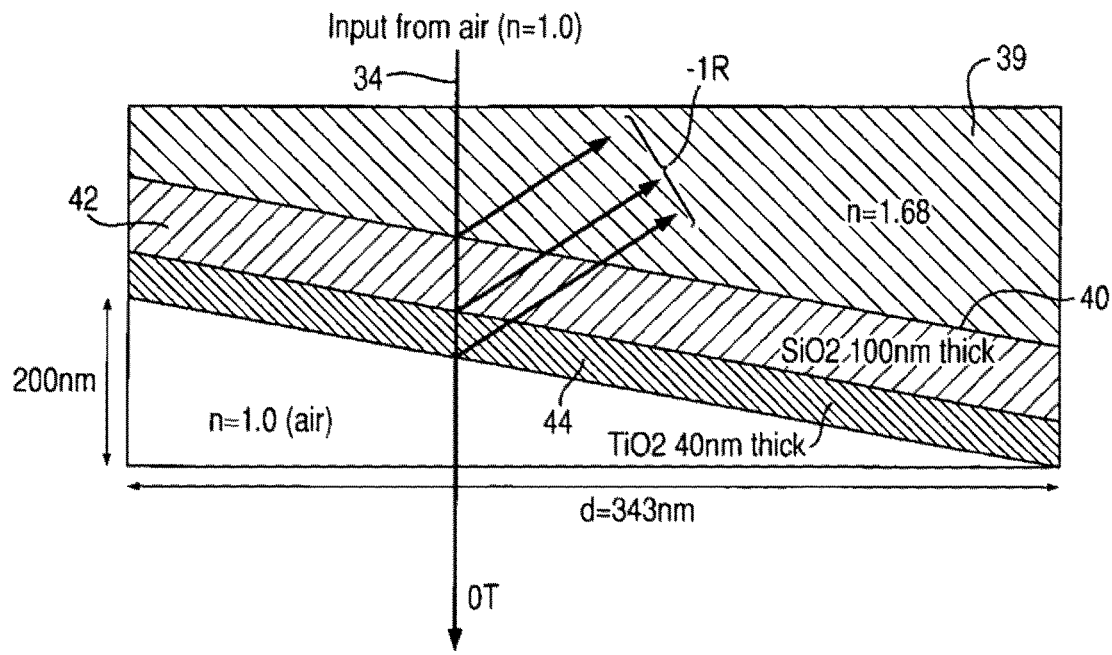
Figure 6:
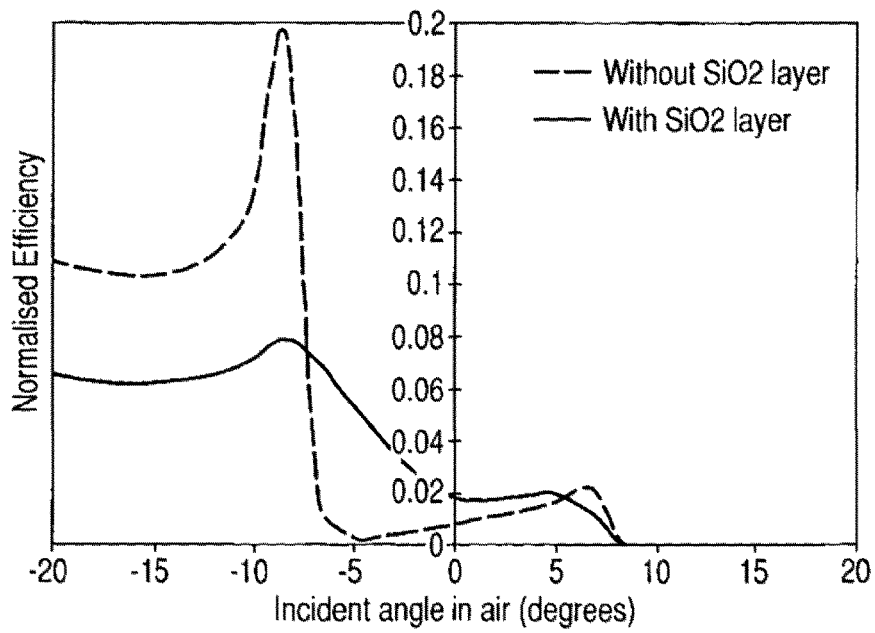
Figure 8:
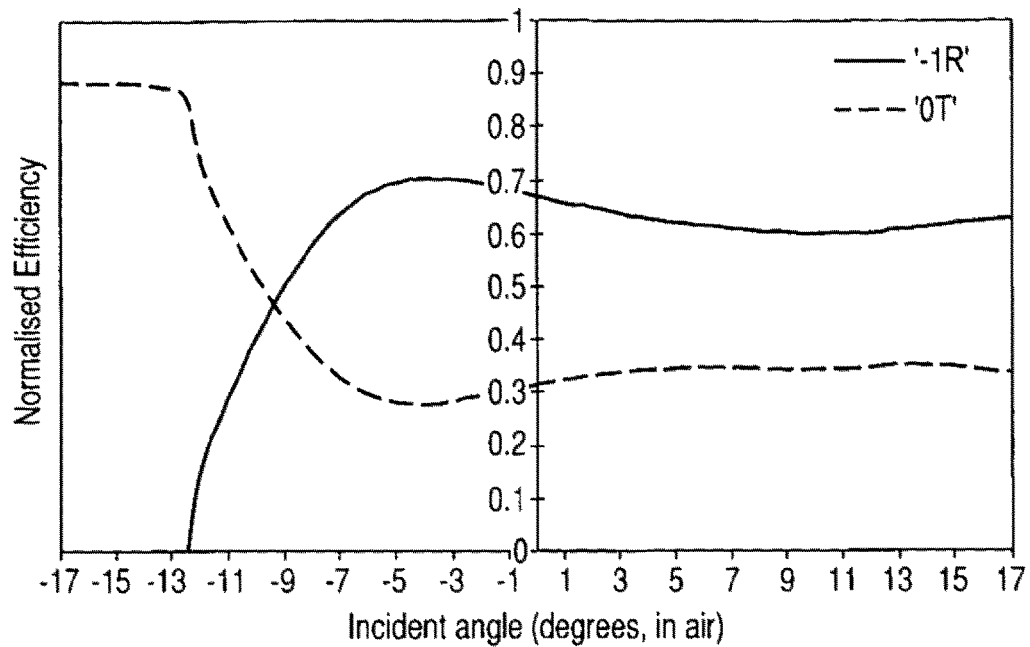
Figure 9:
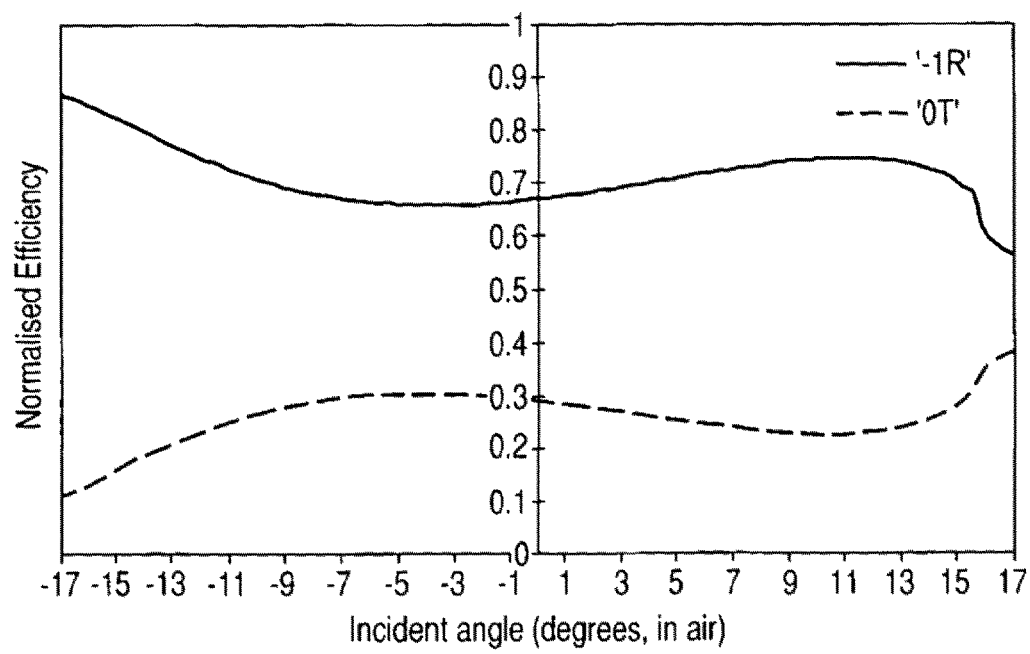
Figure 10:
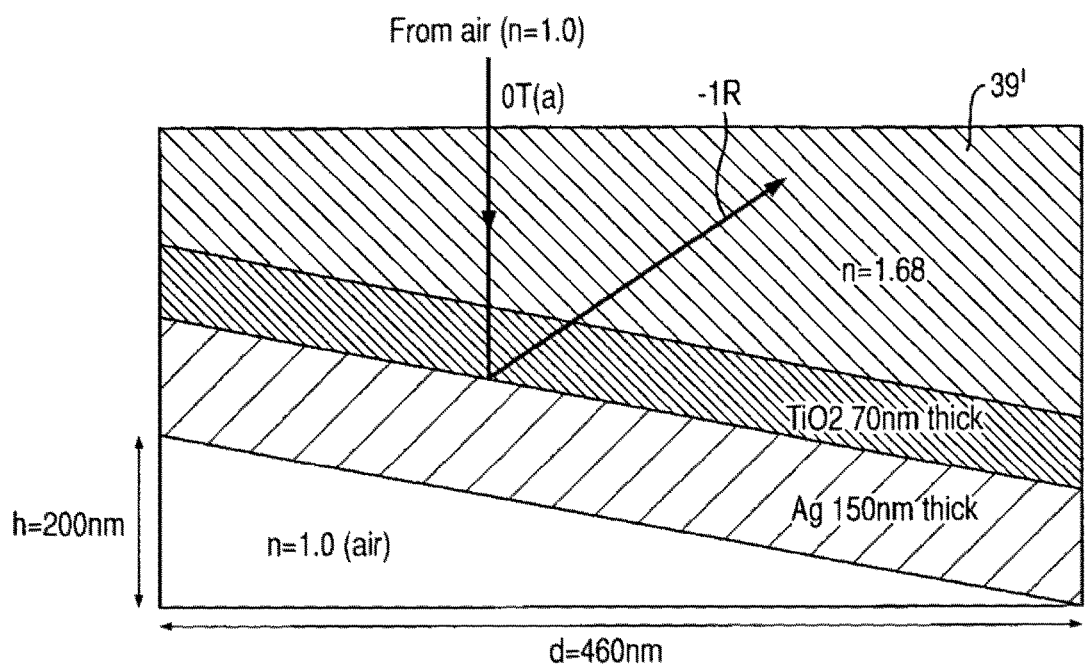
Figure 11:
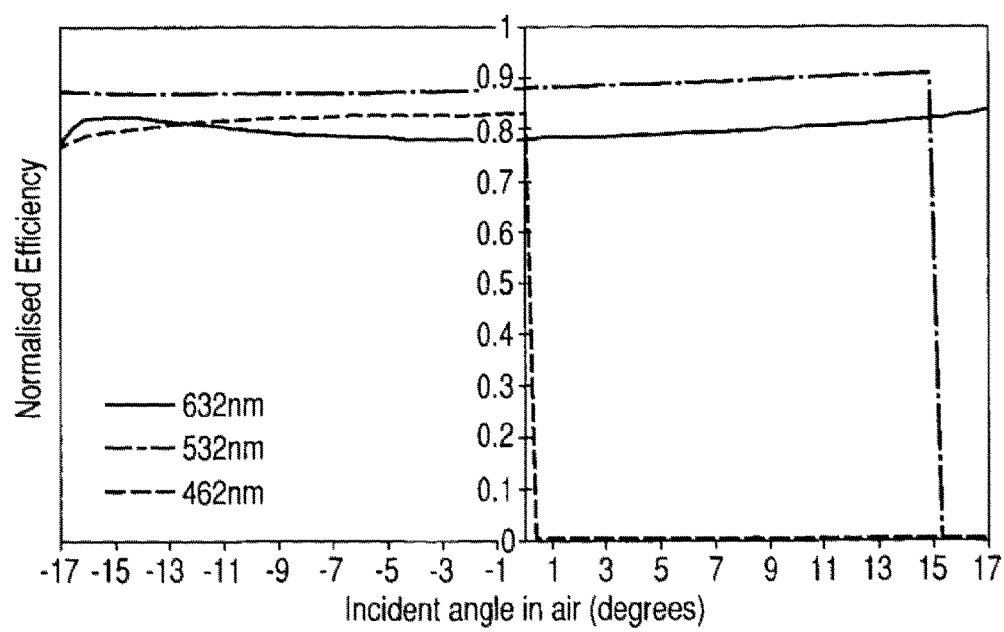
Figure 12:
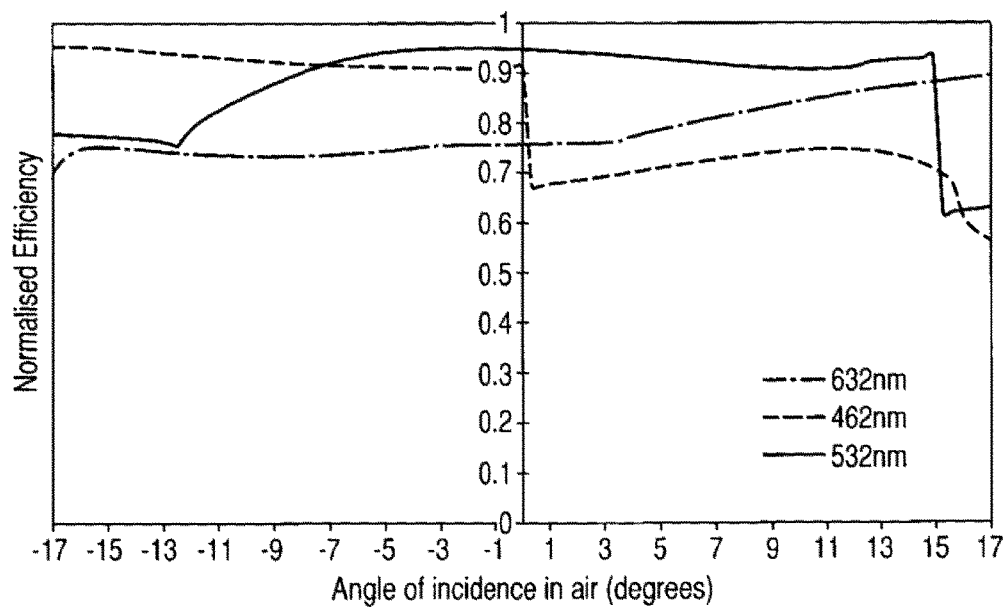

FIGS. 4a and 4b show side views of a structure according to the invention, FIG. 4b being an enlarged view of part of FIG. 4a, FIG. 5 is a further enlarged view of a grating of FIG. 4b, FIG. 6 shows the effect of a coating layer in FIG. 4b, FIGS. 7, 8 and 9 illustrate the operation of the grating of FIG. 5, FIG. 10 is a further enlarged view of another grating of FIG. 4b, FIG. 11 illustrates the operation of the grating of FIG. 10, and FIG. 12 shows the overall transmission efficiency of sub-structure according to the invention, consisting of the elements shown in FIGS. 5 and 10.

Current single-waveguide displays designs can only be optimised for one part of the full colour spectrum. For example FIG. 1 shows the angular output of a waveguide made of a glass having a refractive index of 1.62, and using diffraction gratings having a pitch of 410 nm, for an input image having a 30° field of view. It can be seen that for the three primary colours (red, green and blue) the full 30° field of view is obtained only for the green part of the spectrum (FIG. 1a). Only a portion of the red image can be displayed by the waveguide (FIG. 1b); the remainder of the red rays fail to diffract because they are evanescent. Further, only a portion of the blue image can be displayed (FIG. 1c); when the remainder of the blue rays are injected into the waveguide, they are diffracted at too low an angle for total internal reflection within the waveguide, and thus fail to propagate along it.

Thus, conventionally three waveguides are required for a full colour display unless a stacked volume grating is used.

In the preferred embodiment of the invention a three-colour solution is implemented using only single surface gratings in two waveguides, the outputs of which are shown in FIG. 2. One waveguide has gratings of 343 nm pitch, and displays the majority (and preferably all) of the blue image, at least (and preferably more than) half of the green image and a small part of the red image. The other waveguide has gratings of 460 nm pitch, and displays the majority (and preferably all) of the red image, at least (and preferably more than) half of the green image and a small part of the red image. The outputs of the two waveguides are shown respectively in FIGS. 2a and 2b. The proportion of each colour image displayed by the second waveguide is such that when taken with the proportion of the corresponding colour image displayed by the first waveguide, and properly aligned with it, all of that colour image is displayed; FIG. 2 shows the display for a 34° field of view.

The three colour images do not have to be separated; in fact as shown in FIG. 2 each waveguide will display some of each primary colour image. The two regions of each primary colour image from the two waveguides do however have to complement each other so that a full image is formed in each colour. To ensure that this is achieved, there may be some overlap between the two parts of the image from the respective waveguides. This overlap can improve the efficiency of the display system, without materially affecting the colour balance.

Factors which must be taken into account to achieve a full image in each primary colour include:

The correct choice of (unequal) pitches for the input diffraction gratings of the waveguides. The expansion gratings within each waveguide will generally have a pitch equal to the input grating for that particular waveguide.

The grating profiles, which controls the amount of light diffracted into the required order. Generally, a sawtooth type profile is preferred for input gratings.

The application of suitable coating layers on the input gratings.

Figure 3:
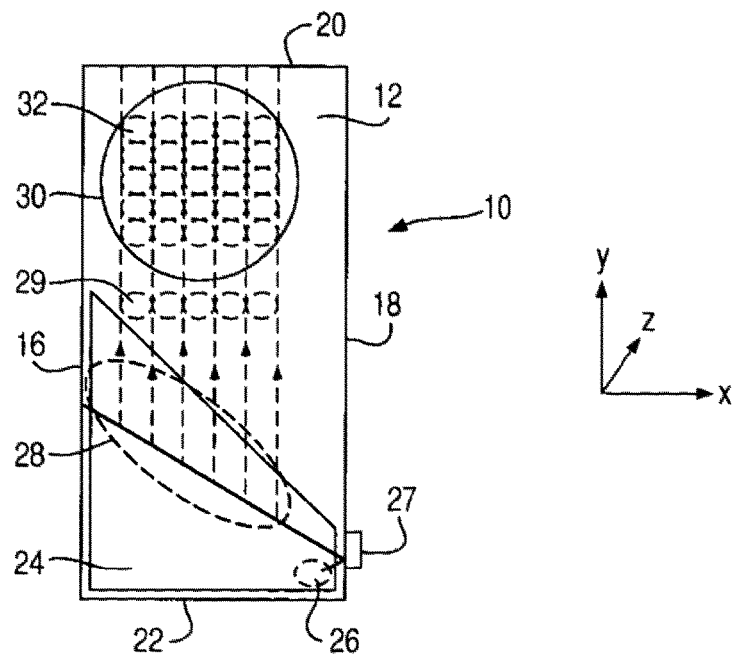
FIG. 3 shows part of a structure according to the invention.

FIG. 3 shows part of a structure according to the invention. It is based on the structure shown in FIG. 4 of our earlier co-pending applications GB0906266.2 and EP09275024.9, the disclosure of which is incorporated herein by reference.

The structure comprises a slab waveguide 10, i.e. one which has parallel principal faces 12, 14 (FIG. 4) and parallel opposite edge surfaces 16, 18 and 20, 22. The waveguide has a grating area 24 in which is provided an input transmission grating 26. Image bearing light is inputted to the input grating 26 generally in the Z-direction (into the plane of the Figure) and, depending on its wavelength either is diffracted to a mirrored region 27 of edge surface 18 and thence to a first pupil expansion grating 28, or is not diffracted. In the latter case it passes through the waveguide and out of the rear surface 16.

A second slab waveguide 10' (FIG. 4a) is disposed immediately behind the waveguide 10. Features corresponding to those of the waveguide 10 have the same reference numerals with the addition of a prime ('). As noted with reference to FIG. 2, the input grating 26 of the first waveguide 10 is of 343 nm pitch, and the input grating 26' of the second waveguide 10' is of 460 nm pitch. In the example given here, all the gratings within a given waveguide will have the same pitch.

Referring to FIG. 4b, incoming light rays 34 bearing a full colour image enter the waveguide 10 though its front principal surface 12 and are incident on the input grating 26. Some of the rays (those forming the image components shown in FIG. 2a) as determined by their wavelengths, the pitch of the grating, and the angle of incidence, are diffracted into the minus one reflected order (labelled $-1R_a$ in FIG. 4a) and propagate within the waveguide via the mirrored surface 27 to the first expansion grating 28 and thence to the second expansion grating 30. The output of the first waveguide thus is the expanded spectral portion of the full image shown in FIG. 2a. Other rays incident on the grating 26 are not diffracted and pass straight though it as the zero transmission order labelled '0Ta' in FIG. 4b.

Some rays may be diffracted into other unwanted orders, and are wasted. In order to minimise this, the grating 26 ideally should be such that any ray not diffracted into the '$-1R_a$' order should stay in the undiffracted '$0T_a$' order. Coatings applied to the profiled surface of the grating 26 can assist towards achievement of this objective as described hereafter.

The transmitted '0Ta' light, which contains the three spectral image portions shown in FIG. 2b is incident on the front surface 12' of the second waveguide 10', and thence upon the input grating 26'. This grating has a mirrored (reflective) coating as described hereafter and thus operates wholly as a reflection grating.

The pitch of the grating (460 nm) is suitable to diffract the incident light into the '$-1R_b$' reflected order. The reflected light propagates within the waveguide via the mirrored surface 27' to the expansion grating 28' and 30', where it is expanded into the three spectral image portions of FIG. 2b.

The two waveguides 10, 10' are accurately positioned relative to each other so that expanded light 36 (FIG. 4a)

issuing from grating 30 of waveguide 10 is incident on grating 30' of waveguide 10' so as to pass through it and combine with the expanded light issuing from grating 30' to form a single full-colour image 38 as described with reference to FIG. 2.

The choice of grating pitches determines how the colours are shared between the two waveguides. The first grating pitch is chosen so that it diffracts most of the blue field of view (FOV) and more than half of the green FOV. The pitch of the grating within the second waveguide is chosen so that it diffracts most of the red FOV and the complementary half of the green FOV. The system is then modelled and the grating pitches are fine-tuned to attain the highest FOV for all three colours.

The diffraction of light into various orders is determined by the grating profile (see for example '*Diffraction Analysis of dielectric surface relief gratings*' M G Moharam and T K Gaylord, *Journ. Optical Soc. America*, Vol 72 Issue 10, pp 1385-1392 (1982)). Application of coatings to their surfaces can further tune the response of the gratings by controlling the phase of the wavefronts diffracted from the interfaces between the coating layers.

FIG. 5 shows one period of the grating 26. It can be seen that the grating has a period (pitch) of 343 nm, and is of saw-tooth form with a height of 200 nm. This height determines the blaze angle of the grating. The profiled grating surface 40 has a coating layer of silicon dioxide 42 of thickness 100 nm, and a further coating layer 44 of titanium dioxide which is 40 nm thick.

Input light 34 is incident on the front surface 12 of waveguide 10 (not shown in FIG. 5), which is of a glass having a refractive index of 1.81. The light then passes though a polymer layer 39 (n=1.68) on which the grating profile 40 is formed and is reflected in various proportions from the polymer/SiO$_2$, the SiO$_2$/TiO$_2$ and TiO$_2$/air interfaces, depending on the angle of incidence and wavelength of each ray. The coating materials and thicknesses are chosen by modelling such that these multiple reflections interfere constructively and therefore the diffraction efficiency into the '−1R' order will be high. Other rays (in this case mainly those towards the red end of the spectrum) at different wavelength and incidence pass through the grating with very little light being diffracted. The grating thus effectively operates as a band pass filter.

The grating shown in FIG. 5 is required to have high diffraction efficiency for the '−1R' order, high transmission efficiency for the '0T' order, and low diffraction efficiency for all other (unwanted) orders. FIG. 6 shows the variation of the '+1R' (unwanted) order efficiency with the incident angle of the incoming light 34 on the front face 12 of the waveguide 10. The presence of the intervening parallel-sided glass material of the waveguide through which the light passes before reaching the polymer layer 39 does not affect the effective angle of incidence on the polymer layer which remains the same regardless of the refractive index of the glass. Without the 100 nm thick SiO$_2$ layer, the efficiency of this order (dotted line) peaks to approximately 20% at an angle of incidence of 8 degrees. Addition of the SiO$_2$ layer suppresses the '+1R' efficiency, as shown by the solid line in the graph, which is desirable.

Figure 7:
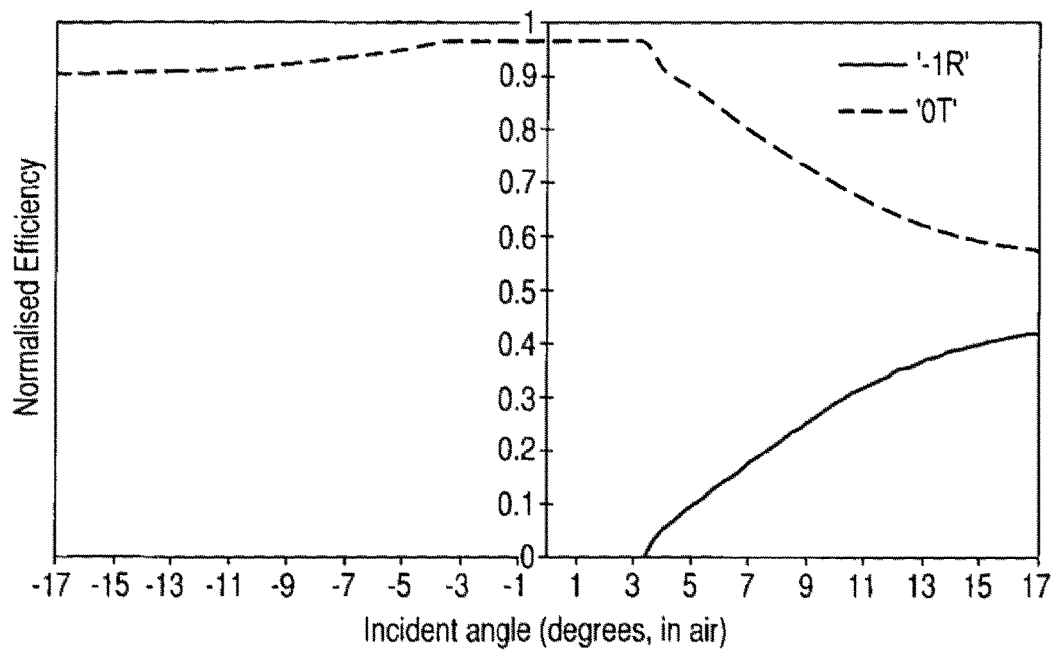

FIG. 7 shows the response of the grating 26 to monochromatic red light of wavelength 632 nm; the incident angle again is that of the incoming light 34 in air on to the front face 12 of the waveguide 10. It will be noted that for angles of incidence of less than 3.5 degrees, the grating does not diffract the rays into the '−1R' order. Instead, they are transmitted through the grating in the '0Ta' mode at a transmission efficiency of 90% or more.

FIG. 8 shows the response of the grating 26 to monochromatic green light of wavelength 532 nm. For angles of incidence of less than 12.5 degrees the grating does not diffract the rays into the −1R order. Zero order transmission (0Ta) in this region is approximately 90%.

The response of the grating 26 to monochromatic blue light of wavelength 462 nm is shown in FIG. 9. Across a field of view of 34 degrees (−17 to +17 degrees), the diffraction efficiency into the −1R order is better than 50% and is better than 65% for almost all of the range.

FIG. 10 shows the reflective grating 26' of the second waveguide 10'. It is of saw-tooth form, with a period (pitch) of 460 nm and a height of 200 nm. It is formed on a polymer layer 39' of refractive index 1.68 and has a grating layer 46 of titanium dioxide, 70 nm thick, backed by a reflective layer 48 of silver, 150 nm thick, from which the incident light is reflected as shown in FIG. 10. As disclosed in our co-pending applications GB0906266.2 and EP09275024.9, addition of the TiO$_2$ layer between the polymer and the silver layer yields, through the phenomenon of phase matching, high diffraction efficiency and high angular bandwidth in the '−1R' order.

From FIG. 11 it can be seen that
For red light (632 nm) the grating 26' diffracts light into the −1R order with an efficiency of ~80% over all angles of incidence on face 12' of waveguide 10'.
For green light (532 nm) the grating 26' does not diffract incident rays at angles of higher than 15 degrees. These rays fail to propagate within the waveguide 10'.
For blue light (462 nm) the grating 26' does not diffract incident rays at angles of higher than zero degrees. Hence these rays fail to propagate in the waveguide 10'.
Outside these incident angle ranges, both blue and green are diffracted into the −1R order with high efficiency.

Considering now the efficiency of the input gratings 26, 26' of the two waveguides 10, 10' in diffracting image-bearing light, for any incident ray of a given incident angle and wavelength, the system efficiency (M) as a fraction of the input light intensity is $$M = \text{'}-1R_a\text{'} + (\text{'}0T_a\text{'} \times \text{'}-1R_b\text{'}).$$

This relationship is shown in FIG. 12. It can be seen that at 632 nm, because grating 26' diffracts across the whole field of view, the overall efficiency is greater than 70%, rising for positive angles of incidence due to the constitution from grating 26. At 532 nm, the efficiency of grating 26' is uniformly high except at angles of incidence (i) above 15 degrees. However this is compensated by the 60% efficiency of grating 26' at those angles. Thus, although there is a sharp reduction in system efficiency from 90% at i>15 degrees, nevertheless the overall efficiency remains adequate at 60%.

At 462 nm, grating 26 has adequate efficiency across the whole field of view (upwards of 60% except for i>15 degrees), and hence the inability of the grating 26' to diffract at i>0 degrees can be tolerated.

The invention also includes any novel feature or combination of features herein disclosed whether or not specifically claimed.

The invention claimed is:
1. An optical structure for receiving light over a field of view, the light bearing first, second and third primary color component images, the optical structure comprising
   a first waveguide, comprising:
      a first input diffraction grating for receiving the light bearing each of the first, second and third primary color component images, configured to diffract at least some of the light bearing each said primary color component image, received over a respective first portion of the field of view, into the first waveguide to propagate along the first waveguide by total internal reflection and to transmit out of the first waveguide at least some of the light bearing each said primary color component image that is not diffracted into the first waveguide; and a first image expansion arrangement comprising at least one expansion grating for expanding the light propagating along the first waveguide and to output at least a portion of the diffracted expanded propagating light out of the first waveguide, and a second waveguide, comprising:

a second input diffraction grating for receiving the undiffracted light transmitted out of the first waveguide by the first input diffraction grating of the first waveguide, configured to diffract at least some of the transmitted light bearing each said primary color component image, received over a respective second portion of the field of view, into the second waveguide to propagate along the second waveguide by total internal reflection, wherein each second portion of the field of view for each said primary color component image is different to the respective first portion and comprises at least that portion of the field of view excluding the respective first portion of the field of view for the primary color component image; and a second image expansion arrangement comprising at least one expansion grating for expanding the light propagating along the second waveguide, to combine at least a portion of the expanded light propagating along the second waveguide with the diffracted expanded light output by the first waveguide and to output the combined diffracted expanded light from the second waveguide;

wherein each of the first and second input diffraction gratings comprise a periodic diffraction grating having a different respective pitch.

2. The optical structure according to claim 1, wherein the first input diffraction grating comprises a periodic diffraction grating structure having a layered coating configured to increase diffraction efficiency of the first input diffraction grating in respect of light bearing each said primary color component image, received over the respective first portion of the field of view, to diffract the received light into the first waveguide and to transmit substantially all of the received light that is not diffracted into the first waveguide.

3. The optical structure according to claim 2, wherein the layered coating of the first input diffraction grating comprises at least one layer of a material selected from one or both of silicon dioxide and titanium dioxide.

4. The optical structure according to claim 1, wherein the second input diffraction grating comprises a periodic diffraction grating structure having a layered coating including a reflective layer, configured to increase diffraction efficiency of the second input diffraction grating in respect of light bearing each said primary color component image, received over the respective second portion of the field of view, to diffract the received light into the second waveguide.

5. The optical structure according to claim 4, wherein the layered coating of the second input diffraction grating comprises at least one layer of titanium dioxide overlaid by the reflective layer comprising a layer of silver.

6. The optical structure according to claim 1, wherein the second waveguide is arranged in parallel with the first waveguide such that light output from the first waveguide passes through the second waveguide and through the second image expansion arrangement and wherein the second image expansion arrangement is arranged to transmit substantially all of the light output from the first waveguide that passes through the second image expansion arrangement.

7. The optical structure according to claim 1, wherein the first and the second image expansion arrangements each comprise a respective first expansion grating arranged to expand light propagating through the respective waveguide in a first dimension and to output at least a portion of the expanded light out of the respective waveguide.

8. The optical structure according to claim 7, wherein the first and the second image expansion arrangements each comprise a respective second expansion grating arranged to expand light propagating through the respective waveguide in a second dimension, different to the first dimension.

9. The optical structure according to claim 1, wherein the first primary color component image is a red component image, the second primary color component image is a green component image and the third primary color component image is a blue component image.

10. The optical structure according to claim 1, wherein each of the first and second input diffraction gratings comprise a periodic diffraction grating having a different respective pitch, selected from 343 nm and 460 nm.

11. A display system comprising the optical structure according to claim 1.

12. The display system according to claim 11, configured for head-mounting, mounting on a helmet or for use as a head-up display.

* * * * *